United States Patent [19]

Usami et al.

[11] Patent Number: 4,903,878
[45] Date of Patent: Feb. 27, 1990

[54] METHOD FOR MANUFACTURING A TAPE GUIDE CYLINDER OF SMALL THICKNESS

[75] Inventors: Mamoru Usami, Tokyo; Yoshitaka Kawamura, Owariasahi, both of Japan

[73] Assignees: Sanwa Needle Bearing Co., Ltd., Aichi; Asahi Seiki Kogyo Kabushiki Kaisha, Tokyo, both of Japan

[21] Appl. No.: 258,824

[22] Filed: Oct. 17, 1988

[30] Foreign Application Priority Data

Apr. 15, 1988 [JP] Japan ............................. 63-92776

[51] Int. Cl.$^4$ ................................... B65H 23/08
[52] U.S. Cl. ......................... 226/190; 72/333; 72/348
[58] Field of Search ............... 72/333, 334, 348, 367, 72/368; 29/148.4 D; 226/190, 194

[56] References Cited

U.S. PATENT DOCUMENTS 802,824 10/1905 Parker ........................... 72/333
4,754,908 7/1988 Tanaka et al. ................. 72/368

FOREIGN PATENT DOCUMENTS 1163141 9/1958 France ........................ 29/148.4 D
643953 8/1962 Italy ............................. 72/367

Primary Examiner—Lowell A. Larson
Attorney, Agent, or Firm—Joseph S. Iandiorio

[57] ABSTRACT

A method for manufacturing a tape guide cylinder of small thickness from metal sheet by combination of drawing processing technique, flange processing technique, piercing technique, trimming technique, curling technique and optionally burring technique of metal working processing is disclosed. The tape guide cylinder produced has flange-like inward portions or inwardly bent portions at both ends of the cylinder which fit on cylinder attaching shaft of a cassette case, respectively. Therefore, the inward portions or inwardly bent portions contribute the reduction of the thickness of the cylinder body and thus the reduction of the material used for the production of a tape guide cylinder.

7 Claims, 6 Drawing Sheets

METHOD FOR MANUFACTURING A TAPE GUIDE CYLINDER OF SMALL THICKNESS

BACKGROUND OF THE INVENTION

The present invention relates to a method for manufacturing a tape guide cylinder of small thickness, and particularly relates to a method for manufacturing a tape guide cylinder of small thickness, for example, fitted to an audio or video machine and having the same dimensional accuracy and strength as a conventional tape guide cylinder while being lower in weight and cost than the conventional tape guide cylinders.

A conventional tape guide cylinder for a cassette tape or the like is made of a cut-off pipe processed at both the ends thereof or a wound sheet, or the one made through the impact processing of slag. However, the costs of audio and video machines in general have been required to be reduced, and thus those of the conventional guide cylinders of such kinds have been also required to be reduced. The reduction in the cost of processing and that in the cost of material are only the two ways of reducing the costs of the tape guide cylinders. Introducing an improved press-working process in which forming can be done in a simple manner, or performing an automation to diminish personnel expenses is only the way of reducing the cost of processing of each of the tape guide cylinders. However, since the tape guide cylinders are of the structures as mentioned above, the processing thereof is almost all automated so that the costs of the processing cannot be much reduced even if improved press-working processes are introduced. Besides, since each of the tape guide cylinders is mass-produced in the amount of several hundred thousands to several millions, the cost of processing thereof is already very low apiece. Therefore, decreasing the cost of material as much as possible might be the only practicable way of reducing the costs of the tape guide cylinders. However, since the material for each of the tape guide cylinders is required to be high in surface hardness and non-magnetic, the whole guide cylinders are usually made of a non-magnetic stainless steel of high quality and cost. For that reason, if the material is much used, the cost of the material of each tape guide cylinder cannot be reduced but becomes high. As for the tape guide cylinder made through the impact processing of slag, the tape guide cylinder is made of aluminum or brass and has its outside surface subjected to hard chromium plating.

Thus, decreasing of the thickness of material sheet for each of the conventional tape guide cylinders is attempted so as to reduce the cost of material therefor. However, since the reference inside and outside diameters of each tape guide cylinder are standardized for the forming of a cassette, the thickness of the material sheet can hardly be decreased. In other words, if the inside diameter of the tape guide cylinder is fixed to the standardized value and the thickness thereof is diminished, the outside diameter thereof decreases to make it likely that the cassette tape is located closer to the body of the cassette to come into contact therewith and be scratched. On the other hand, if the outside diameter of the tape guide cylinder is fixed to the standardized value and the thickness thereof is diminished, the inside diameter thereof becomes larger than the standardized value to allow the tape guide cylinder to play not to function properly when fitted on guide cylinder attaching shafts. In that case, the design of the cassette needs to be changed, and thus result in the increase in the costs of producing the cassettes. Nevertheless, the manufacturers of such tape guide cylinders have been striving to reduce the costs thereof to win an international competition, but have not succeeded in much reducing the costs thereof.

SUMMARY OF THE INVENTION

Therefore, it is an object of the present invention to obviate the above mentioned problems and circumstances and to provide a method for manufacturing a tape guide cylinder, for example, fitted to an audio or video machine and having the same dimensional accuracy and strength as a conventional tape guide cylinder while being much lower in cost and lower in weight than the conventional tape guide cylinder.

The above object is accomplished by the present invention. That is, the first aspect of the present invention is directed to a method for manufacturing a tape guide cylinder of small thickness comprising contracting a metal sheet repeatedly so as to form a slender bottomed cylinder of small thickness, subjecting the bottomed cylinder to flange processing to form a flange at an open top thereof, subjecting the bottomed cylinder to piercing at the bottom thereof so as to form a substantially flange-like inward portion having a prescribed inside diameter, trimming the flange so as to shape the open top, and subjecting the trimmed open top to curl so as to form another substantially flange-like inward portion having the same inside diameter as the former inward portion at the top of the cylinder.

The object of the present invention can be accomplished by the following second aspect of the present invention. The second aspect of the present invention is substantially the same as the first aspect of the present invention except for the order of flange processing process and trimming process. That is, the second aspect of the present invention is directed to a method for manufacturing a tape guide cylinder of small thickness comprising drawing a metal sheet repeatedly so as to form a slender bottomed cylinder of small thickness, subjecting the bottomed cylinder to flange processing to form a flange at an open top thereof, trimming the flange so as to shape the open top thereof, curling the trimmed open top of the bottomed cylinder so as to form a substantially flange-like inward portion having a prescribed inside diameter at the open top of the bottomed cylinder, and then subjecting the resultant bottomed cylinder to piercing at the bottom thereof so as to form another substantially flange-like inward portion having the same inside diameter as the former inward portion of the cylinder.

The object of the present invention can be accomplished by the following third and forth aspects of the present invention. The feature of the third and forth aspect of the present invention exists in that burring process is done to the flange-like inward portions of the tape guide cylinder so as to make the contact area of the cylinder and the cylinder attaching shafts as large area as possible upon assembling a cassette.

That is, the third aspect of the present invention is directed to a method for manufacturing a tape guide cylinder of small thickness comprising drawing a metal sheet repeatedly so as to form a slender bottomed cylinder of small thickness, subjecting the bottomed cylinder to flange processing to form a flange at an open top thereof, subjecting the bottomed cylinder to piercing at the bottom thereof so as to form a substantially flange-like inward portion thereof, subjecting the inward portion to burring so as to form an inwardly bent portion having an inner peripheral surface of a prescribed diameter, trimming the open top of the pierced cylinder so as to shape the open top thereof, curling the trimmed open top of the pierced cylinder so as to form another substantially flange-like inward portion, and bending the flange-like inward portion so as to form another inwardly bent portion having an inner peripheral surface of the same diameter as that of the former inwardly bent portion of the cylinder.

And further, the forth aspect of the present invention is directed to a method for manufacturing a tape guide cylinder of small thickness comprising drawing a metal sheet repeatedly so as to form a slender bottomed cylinder of small thickness, subjecting the bottomed cylinder to flange processing to form a flange at an open top thereof, trimming the flange so as to shape the open top thereof, curling the trimmed open top of the bottomed cylinder so as to form a substantially flange-like inward portion, subjecting the resultant bottomed cylinder to piercing at the bottom thereof so as to form another substantially flange-like inward portion having the same inside diameter as the former inward portion of the cylinder, and subjecting both the flange-like inward portions to burring so as to form inwardly bent portions having inner peripheral surfaces of the same diameter at both the top and bottom of the cylinder.

According to each of the above mentioned aspects of the present invention, the tape guide cylinder can be manufactured through a series of sequential processes of press work. For that reason, the methods of the present invention are appropriate to mass-produce the tape guide cylinders and greatly reduce the cost of processing thereof.

Further, since the tape guide cylinders produced by the methods of the present invention have the inward portions or the inwardly bent portions, the tape guide cylinders are surely provided with enough strength even though the thickness thereof is smaller than conventional one and the tape guide cylinders comply with standards therefor. For that reason, the costs of the material for producing each of the tape guide cylinders produced by the methods of the present invention are also greatly reduced.

Therefore, the total cost of processing and material for producing each of the tape guide cylinders can be actually decreased to about a half of that of the conventional tape guide cylinders without altering the designing thereof.

DESCRIPTION OF THE INVENTION

Figure 3:
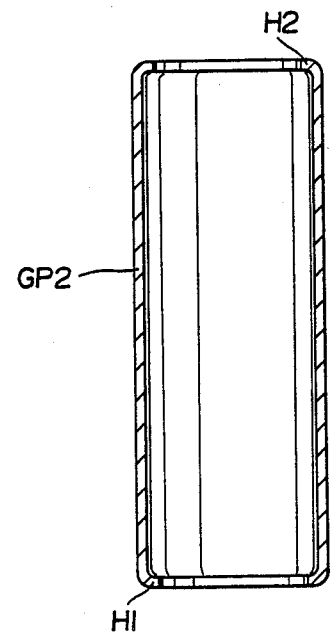

The present invention will be explained in more detail with referring to the accompanied drawings. The embodiment is a method for manufacturing a tape guide cylinder GP2, both the ends thereof being bent almost perpendicular to the longitudinal direction thereof as shown in FIG. 3. In the embodiment, the tape guide cylinder GP2 is manufactured by using a transfer press machine which comprises fifteen or more processing stages being connected to each other as shown in FIGS. 1(A), 1(B), 1(C) and 1(D).

Figure 1A:
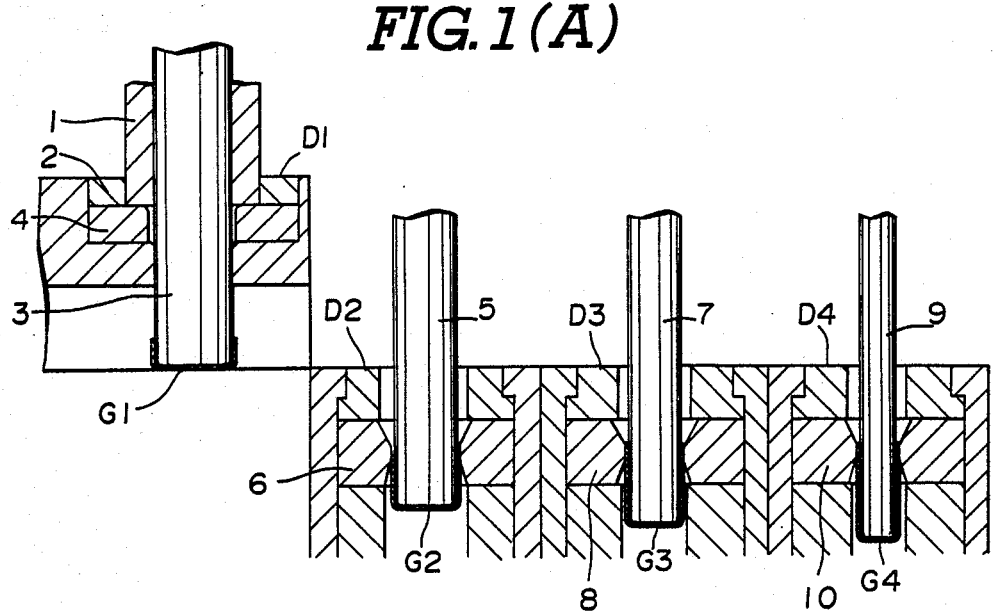
FIGS. 1(A), 1(B), 1(C) and 1(D) are a flow diagram of the processes of a tape guide cylinder manufacturing method according to an embodiment of the present invention.

When the tape guide cylinder GP2 is to be manufactured by the method using the transfer press machine, a thin metal sheet of non-magnetic stainless steel, copper, copper alloy, aluminum or aluminum alloy is first sent from a reel(not shown in the drawings) to the first processing stage of the transfer press machine, which is shown in FIG. 1(A).

In the first processing stage, the material of substantially circular disk is blanked from the metal sheet and subsequently the blanked circular disk is subjected to drawing by the first processing unit D1 comprising a blanking punch 1, a blanking die 2 concentric thereto, the first drawing punch 3 and the first drawing die 4 concentric thereto to produce a bottomed cylinder G1 of large diameter and small length.

Figure 1B:
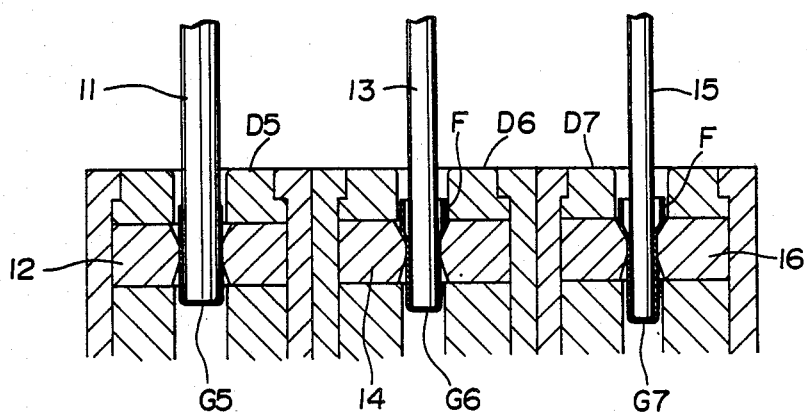

In the second, the third, the forth and the fifth processing stages shown in FIGS. 1(A) and 1(B), the bottomed cylinder G of large diameter and small length is sequentially drawn further into bottomed cylinders G1, G2, G3, G4 and G5 of sequentially smaller diameters and larger lengths by the second, the third, the forth and the fifth drawing processing units D2, D3, D4 and D5 each of which comprises the second drawing punch 5 and the second drawing die 6 concentric thereto, the third drawing punch 7 and the third drawing die 8, the forth drawing punch 9 and the forth drawing die 10, and the fifth drawing punch 11 and the fifth drawing die 12, the second drawing punch 5, the third drawing punch 7, the forth drawing punch 9 and the fifth drawing punch 11 having sequentially-reduced drawing diameter, the second drawing die 6, the third drawing die 8, the forth drawing die 10 and the fifth drawing die 12 being concentric thereto, respectively.

Figure 1C:
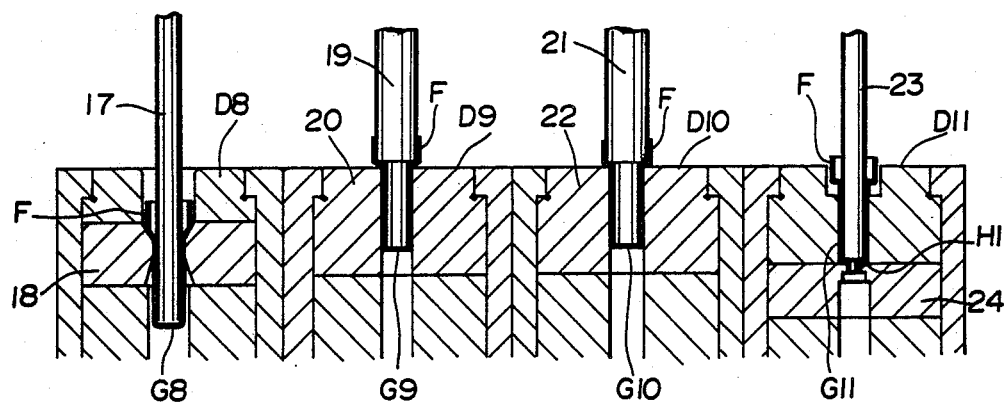

In the sixth, the seventh and the eighth processing stages shown in FIGS. 1(B) and 1(C), the bottomed cylinders G6, G7 and G8 of sequentially smaller diameters and larger lengths are sequentially drawn further by the sixth, the seventh and the eighth processing units D6, D7 and D8 each of which comprises the sixth drawing punch 13 and the sixth drawing die 14, the seventh drawing punch 15 and the seventh drawing die 16, and the eighth drawing punch 17 and the eighth drawing die 18, the sixth drawing punch 13, the seventh drawing punch 15 and the eighth drawing punch 17 having sequentially-reduced drawing diameter, the sixth drawing die 14, the seventh drawing die 16 and the eighth drawing die 18 being concentric thereto, respectively, while sequentially forming a flange F at an open top of the sequentially drawn cylinders.

Subsequently, in the ninth and tenth processing stages shown in FIG. 1(C), the flange F of the bottomed cylinders G9 and G10 is subjected to flanging by the ninth and the tenth processing units D9 and D10 each of which comprises a flanging punch 19 and a flanging guide 20, and a flanging punch 21 and a flanging guide 22, respectively, until the flange F becomes perpendicular to the body of the bottomed cylinder G10 at the bent portion thereof.

In the eleventh processing stage shown in FIG. 1(C), the bottom of the bottomed cylinder G11 contracted to a desired form through the preceding processing stages is subjected to piercing by the eleventh processing unit D11 which comprises a bottom piercing punch 23 and a bottom piercing die 24 concentric thereto, so that a hole having the same diameter as that of the tape guide cylinder GP2 completed as shown in FIG. 3 and fitting on a guide cylinder attaching shaft S and a substantially flange-like inward portion H1 are provided in the bottomed cylinder G11 at the bottom thereof.

Figure 1D:
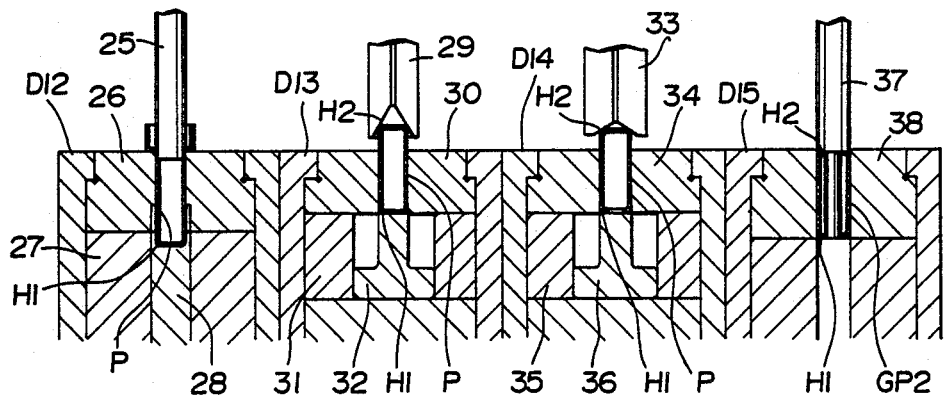

In the twelfth processing stage shown in FIG. 1(D), the flange F of the bottomed cylinder is trimmed to prescribed dimensions by the twelfth processing unit D12 which comprises a trimming punch 25, a trimming die 26, a liner 27 and a knockout 28 to produce a cylinder P. At this time, the flange F remained as a scrap on the trimming punch 25 is removed therefrom by a stripper(not shown in the drawings) and ejected from the work line of the transfer press machine.

In the thirteenth and the fourteenth processing stages shown in FIG. 1(D), the cylinder P is sequentially curled at the open top thereof by a thirteenth and a fourteenth processing units D13 and D14 each of which comprises a curling punch 29 having a conical recess in the top end thereof and a guide 30, a liner 31 and a knockout 32, and a curling punch 33 having a conical recess in the bottom thereof, a guide 34, a liner 35 and a knockout 36, respectively, the surface of the conical recess of the curling punch 29 having a smaller vertical angle than that of the other curling punch 33, and the surface of the conical recess of the curling punch 29 and 33 being sequentially brought into curling the open top of the cylinder P to form another inward portion H2 at the top thereof.

Finally in the fifteenth processing stage shown in FIG. 1(D), the cylinder P is pressed at the top thereof almost perpendicularly to the longitudinal direction thereof by the stepped portion of the fifteenth punch 37 of the fifteenth processing unit D15 which comprises a punch 37 and a guide 38, until the inward portion H2 is completed to make the diameter of the hole thereof equal to that of the hole of the other inward portion H1. The tape guide cylinder GP2 is thus completed.

Figure 2:
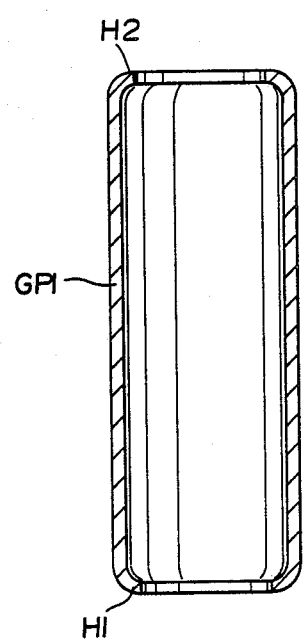
FIGS. 2, 3, 4(A) and 4(B) are cross-sectional views of tape guide cylinders manufactured by the methods according to embodiments of the present invention.

In the meanwhile, in the case of manufacturing another tape guide cylinder GP1 shown in FIG. 2 in accordance with the present invention, round shape forming is performed in another processing stage after the bottom hole piercing in the eleventh processing stage and subsequently the remaining twelfth and thirteenth press-working process are thereafter performed. And then, the manufacturing of the tape guide cylinder GP1 is completed in the fourteenth processing stage shown in FIG. 1(D).

The tape guide cylinder GP2 shown in FIG. 3 can be otherwise manufactured in accordance with the present invention. In that case, the order of the processing stages is changed so that the flanging is performed in the tenth processing stage after the processing in the preceding stages, the trimming is performed in the twelfth processing stage, the top curling is performed in the thirteenth and the fourteenth processing stages, the top curling is performed further in the fifteenth processing stage to make the top of the cylinder almost perpendicular to the longitudinal direction thereof to form the inward portion H2, as mentioned above, and the bottomed cylinder is thereafter pierced at the bottom thereof and formed with the other sideward portion H1 having the same inside diameter as the former sideward portion H2, thus completing the tape guide cylinder.

Figure 4:
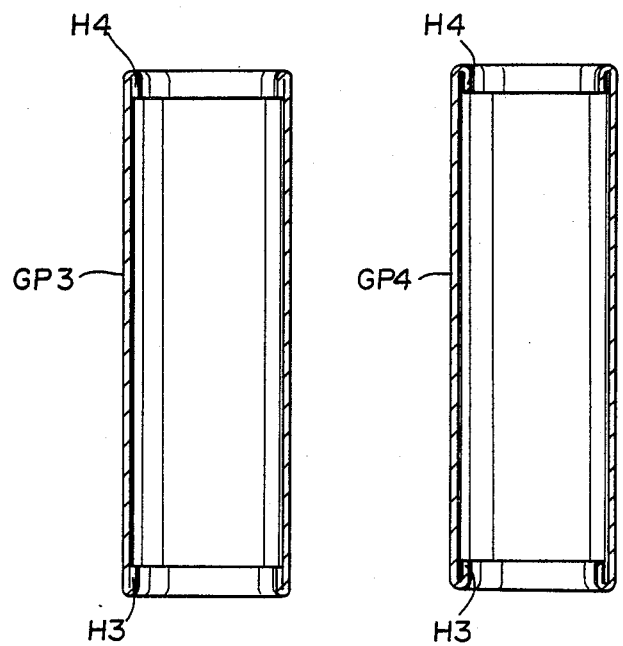
Figure 6:
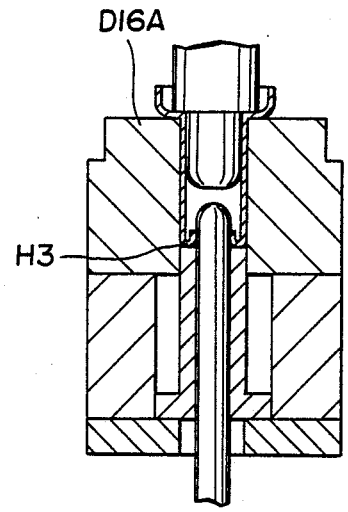
FIGS. 6(A), 6(B) and 6(C) are additional flow diagrams of the processes of tape guide cylinder manufacturing methods showing burring processes according to embodiments of the present invention.
Figure 6:
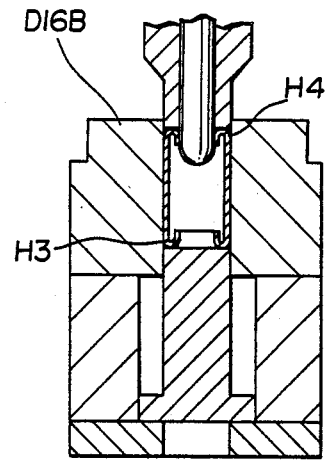
Figure 6:
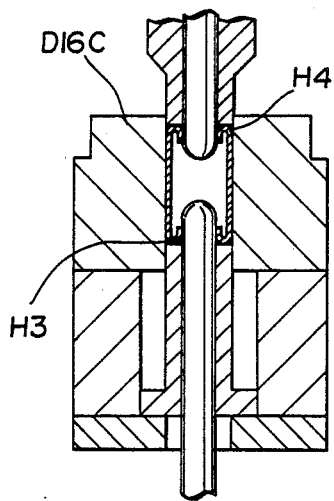

In addition, in the case of manufacturing still another tape guide cylinder GP4 shown in FIG. 4 in accordance with the present invention, the inward portion H1 is bent upward by a sixteenth processing unit D16A in another processing stage as shown in FIG. 6(A), after the bottom piercing in the eleventh processing stage, to form an inwardly bent portion H3 having a hole of such diameter as to enable the fitting of the guide cylinder attaching shaft S in the hole. Subsequently, the press-working in the twelfth, the thirteenth, the fourteenth and the fifteenth processing stages are performed, and the cylinder is then bent downward at the top thereof by the bending punch of another sixteenth processing unit D16B in a sixteenth stage as shown in FIG. 6(B), to form another inwardly bent portion H4 having a hole of the same diameter as that of the former inwardly bent portion H3, thu completing the tape guide cylinder GP4.

The tape guide cylinder GP4 can be otherwise manufactured in accordance with the present invention. In that case, the order of the proceeding stages is changed so that the flanging is performed in the tenth processing stage after the processing in the preceding processing stages, the trimming is performed in the twelfth processing stage, the top curling is performed in the thirteenth and the fourteenth processing stages, the bent top of the cylinder P is bent further almost perpendicularly to the longitudinal direction of the cylinder in the fifteenth processing stage to form the inward portion H2, the bottomed cylinder is thereafter pierced at the bottomed thereof shown in the eleventh stage to form the other inward portion H1 of the same inside diameter as the former inward portion H2 to produce the tape guide cylinder GP2 shown in FIG. 3, and the inward portions H1 and H2 are then bent upward and downward by the bending punches of still another sixteenth processing unit D16C in another sixteenth processing stage as shown in FIG. 6(C), so as to simultaneously form the inwardly bent portions H3 and H4, thus completing the tape guide cylinder GP4. In that case, the inwardly bent portions H3 and H4 are either brought into contact with the body of the cylinder P as shown in FIG. 4(A), or not brought into contact therewith as shown in FIG. 4(B), depending on the thickness of the thin metal sheet, as prescribed in the standards for the inside and outside diameters of the tape guide cylinder.

Incidentally, in the case where a different processing stage needs to be added to the existing processing stages as described above, it can be provided in an appropriate position between or behind the existing processing stages.

Figure 5:
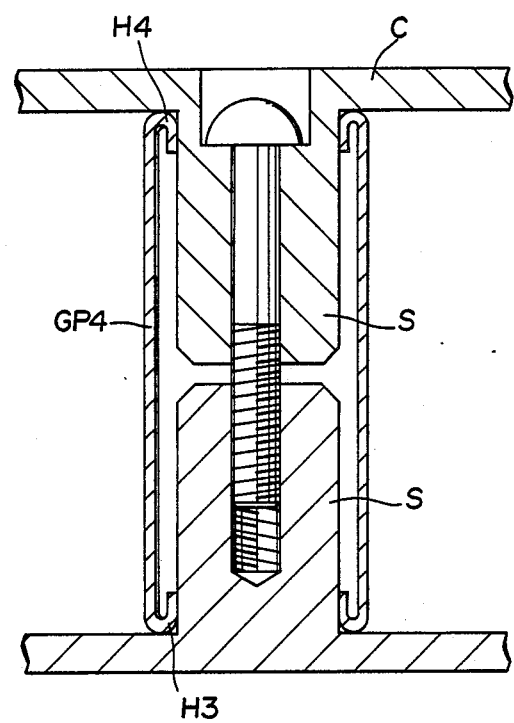
FIG. 5 is a cross-sectional view of the tape guide cylinder in a state of use.

The guide cylinder attaching shafts S projecting from a cassette C are fitted into each of the tape guide cylinders GP1, GP2, GP3 and GP4 from both the ends thereof in use as shown in FIG. 5. FIG. 5 indicates the attached state of the tape guide cylinder GP4 in use.

It will be obviously understood from the above description that the present invention is not restricted to the above described embodiments but may be embodied in other various ways. Besides, the tape guide cylinders GP1, GP2, GP3 and GP 4 can be used for other various purposes.

What is claimed is:

1. A method for manufacturing a tape guide cylinder of small thickness comprising;
    drawing a metal sheet repeatedly so as to form a slender bottomed cylinder of small thickness,
    subjecting the bottomed cylinder to flange processing to form a flange at an open top thereof,
    subjecting the bottomed cylinder to piercing at the bottom thereof so as to form a substantially flange-like inward portion having a prescribed inside diameter,
    trimming the flange so as to shape the open top, and
    subjecting the trimmed open top to curl so as to form another substantially flange-like inward portion having the same inside diameter as the former inward portion at the top of the cylinder.

2. A method for manufacturing a tape guide cylinder of small thickness comprising;
    drawing a metal sheet repeatedly so as to form a slender bottomed cylinder of small thickness,
    subjecting the bottomed cylinder to flange processing to form a flange at an open top thereof,
    trimming the flange so as to shape the open top thereof,
    curling the trimmed open top the bottomed cylinder so as to form a substantially flange-like inward portion having a prescribed inside diameter at the open top of the bottomed cylinder, and then
    subjecting the resultant bottomed cylinder to piercing at the bottom thereof so as to form another substantially flange-like inward portion having the same inside diameter as the former inward portion of the cylinder.

3. A method for manufacturing a tape guide cylinder of small thickness comprising;
    drawing a metal sheet repeatedly so as to form a slender bottomed cylinder of small thickness,
    subjecting the bottomed cylinder to flange processing to form a flange at an open top thereof,
    subjecting the bottomed cylinder to piercing at the bottom thereof so as to form a substantially flange-like inward portion thereof,
    subjecting the inward portion to burring so as to form an inwardly bent portion having an inner peripheral surface of a prescribed diameter,
    trimming the open top of the pierced cylinder so as to shape the open top thereof,
    curling the trimmed open top of the pierced cylinder so as to form another substantially flange-like inward portion, and
    bending the flange-like inward portion so as to form another inwardly bent portion having an inner peripheral surface of the same diameter as that of the former inwardly bent portion of the cylinder.

4. A method for manufacturing a tape guide cylinder of small thickness comprising;
    drawing a metal sheet repeatedly so as to form a slender bottomed cylinder of small thickness,
    subjecting the bottomed cylinder to flange processing to form a flange at an open top thereof,
    trimming the flange so as to shape the open top thereof,
    curling the trimmed open top of the bottomed cylinder so as to form a substantially flange-like inward portion thereof,
    subjecting the resultant bottomed cylinder to piercing at the bottom thereof so as to form another substantially flange-like inward portion having the same inside diameter as the former inward portion of the cylinder, and
    subjecting both the flange-like inward portions to burring so as to form inwardly bent portions having inner peripheral surfaces of the same diameter at both the top and bottom of the cylinder.

5. The tape guide cylinder made according to the process of claim 1 comprising:
    a cylindrical member having two ends and having a body section; and
    an inwardly bent portion formed integrally at each said end of the body section, for engaging a cylinder mount.

6. The tape guide cylinder of claim 5 wherein at least one of said inwardly bent portions is in contact with said body section.

7. The tape guide cylinder of claim 5 wherein at least one of said inwardly bent portions does not contact said body section.

* * * * *